United States Patent [19]

Ohno

[11] Patent Number: 4,544,517

[45] Date of Patent: Oct. 1, 1985

[54] AUTOMATIC COMPOSITE PRESS TECHNIQUE FOR PRODUCING CUTTING INSERTS

[75] Inventor: John M. Ohno, Plymouth, Mich.

[73] Assignee: General Electric Co., Detroit, Mich.

[21] Appl. No.: 331,376

[22] Filed: Dec. 16, 1981

[51] Int. Cl.⁴ .............................................. C04B 31/16
[52] U.S. Cl. ..................................... 264/113; 51/295;
51/307; 264/60
[58] Field of Search .................. 51/307, 293; 264/359,
264/332, 113, 60

[56] References Cited

U.S. PATENT DOCUMENTS

| | | | |
|---|---|---|---|
| 1,567,071 | 12/1925 | Martin | 264/259 |
| 2,137,986 | 11/1938 | Sanford | 264/259 |
| 2,386,604 | 10/1945 | Goetzel | 264/332 |
| 2,475,565 | 7/1949 | Houchins | 51/308 |
| 2,938,807 | 5/1960 | Anderson | 106/44 |
| 3,391,444 | 7/1968 | Haller | 264/332 |
| 3,745,623 | 7/1973 | Wentorf | 51/307 |
| 3,816,081 | 6/1974 | Hale | 75/203 |
| 4,018,631 | 4/1977 | Hale | 428/469 |
| 4,063,909 | 12/1977 | Mitchell | 51/309 |
| 4,120,731 | 10/1978 | Hillig et al. | 264/271 |
| 4,124,401 | 11/1978 | Lee et al. | 51/307 |
| 4,151,686 | 5/1979 | Lee et al. | 51/307 |
| 4,167,399 | 9/1979 | Lee et al. | 51/307 |
| 4,168,957 | 9/1979 | Lee et al. | 51/309 |
| 4,171,339 | 10/1979 | Lee et al. | 264/332 |
| 4,173,614 | 11/1979 | Lee et al. | 51/307 |
| 4,219,339 | 8/1980 | Wilson | 51/307 |
| 4,220,455 | 9/1980 | St. Pierre | 51/295 |
| 4,220,677 | 9/1980 | Fedoseev et al. | 427/215 |
| 4,231,195 | 11/1980 | De Vries | 51/307 |
| 4,238,433 | 12/1980 | Hillig et al. | 264/60 |
| 4,241,135 | 12/1980 | Lee et al. | 428/332 |
| 4,242,106 | 12/1980 | Morelock | 51/307 |
| 4,247,304 | 1/1981 | Morelock | 51/295 |
| 4,268,276 | 5/1981 | Bovenkerk | 264/332 |
| 4,268,582 | 5/1981 | Hale | 428/466 |
| 4,359,335 | 11/1982 | Garner | 51/309 |

FOREIGN PATENT DOCUMENTS

| | | | |
|---|---|---|---|
| 2006733 | 5/1979 | United Kingdom . | |
| 624796 | 8/1978 | U.S.S.R. | 264/308 |

OTHER PUBLICATIONS

European Patent Application 010,257, Apr. 1980.
European Patent Application 012,966, Jul. 1980.

*Primary Examiner*—James Derrington
*Attorney, Agent, or Firm*—Hedman, Gibson, Costigan & Hoare

[57] ABSTRACT

A technique for providing an intermediate composite adapted to be reaction sintered to produce a cutting insert includes the steps of positioning a pellet of material disposed within a holder on top of a first plunger within a mold by moving the holder and pellet into alignment with the plunger through the use of a first feeder device. A powder mix is then disposed adjacent to at least a portion of the pellet within the mold by a second feeder device. The powder mix and the pellet are compressed together in the mold to produce the intermediate composite which is then removed from the mold for reaction sintering in accordance with the press and treat technique.

13 Claims, 12 Drawing Figures

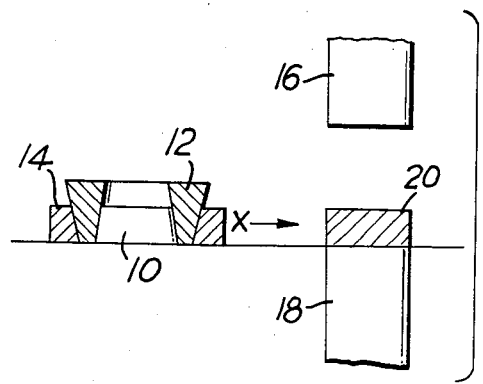
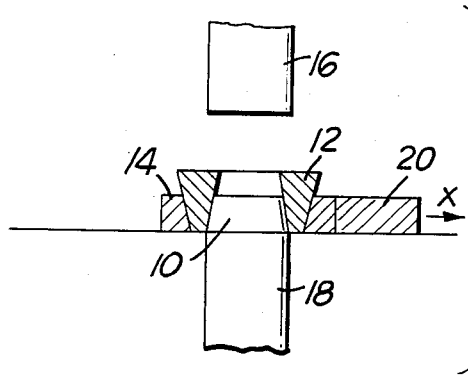
FIG. 1 FIG. 2
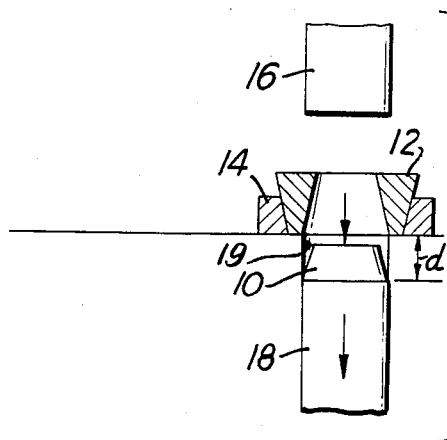
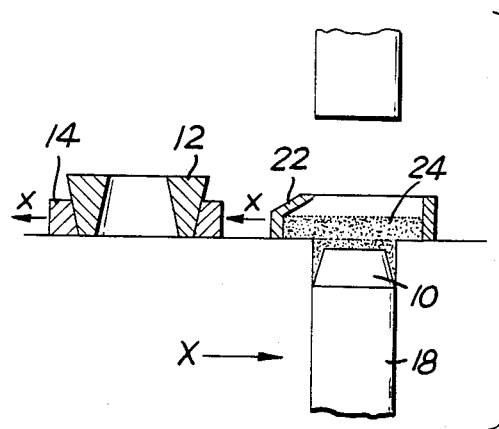
FIG. 3 FIG. 4

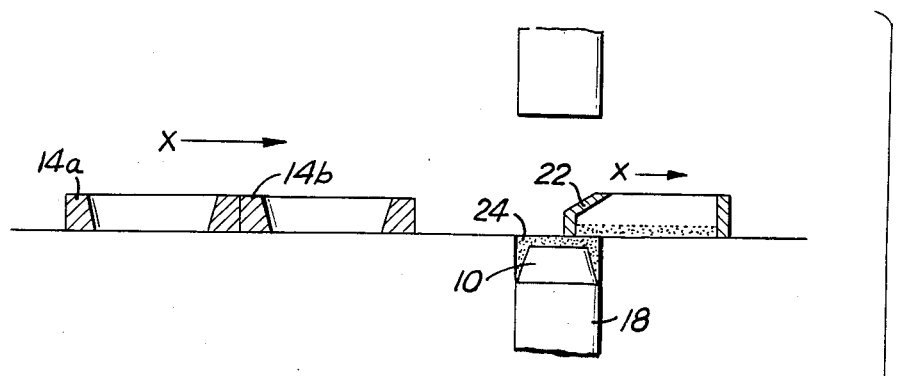
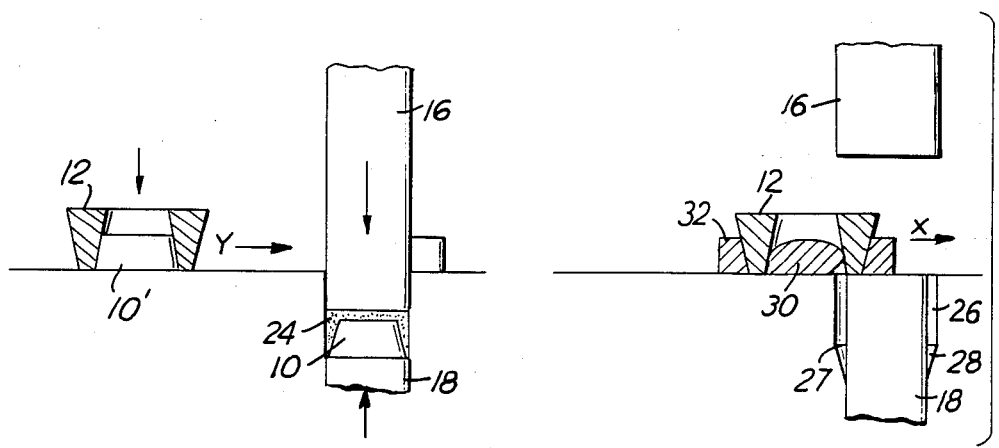
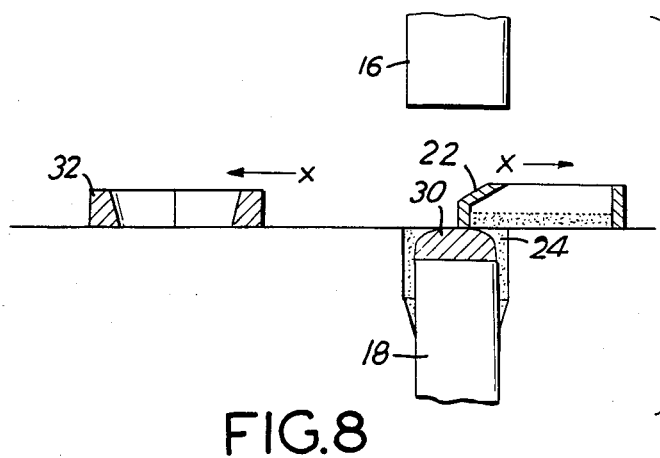

AUTOMATIC COMPOSITE PRESS TECHNIQUE FOR PRODUCING CUTTING INSERTS

BACKGROUND OF THE INVENTION

The present invention is directed to the technique of rapidly and economically producing cutting inserts particularly silicon carbide cutting inserts of the type described in co-pending U.S. patent application Ser. Nos. 167,019 and 167,196, by Dr. John M. Ohno, both filed July 9, 1980, and assigned to the assignee of the present invention, both abandoned in favor of co-pending continuation application Ser. Nos. 313,241 now U.S. Pat. No. 4,428,755 and 312,987, now U.S. Pat. No. 4,417,906 respectively, the entire disclosures of which are hereby incorporated by reference.

Disclosed in the above-mentioned co-pending applications is a straightforward technique (hereinafter referred to as the "press and treat" technique) for economically and rapidly forming a composite body for use as a cutting insert. Very briefly, the press and treat technique involves the preparation of a first or crystal dispersion of super-hard crystals such as diamond or cubic boron nitride crystals in carbon black and a second or core dispersion of carbon black, carbon fiber and filler material such as $\alpha$ or $\beta$ silicon carbide. The two dispersions are individually mixed with a small amount of temporary binder, such as paraffin, to lend a sufficient green strength to the two dispersions upon cold compaction thereof. After compacting the two dispersions together in a desired configuration, but compact is vacuum heated in the presence of silicon to burn off the paraffin and to allow the silicon to infiltrate both dispersions. Upon further heating, and without the need for the constant application of any type of pressure to the insert, the silicon reacts with the carbon black to form a $\beta$-silicon carbide and silicon matrix which bonds both dispersions both internally and to each other.

The inserts produced in accordance with the press and treat technique may be provided with a wide variety of configurations in which the crystal and core portions may be disposed. For example, in the insert produced according to Ser. No. 312,987, the diamond dispersion layer is provided as a planar surface covering the core dispersion layer, while in Ser. No. 313,241, the crystal dispersion is provided exclusively about the periphery of the core dispersion, on the upper surface thereof. In co-pending U.S. patent application Ser. Nos. 286,613 now U.S. Pat. No. 4,504,284 and 226,604, now abandoned, filed July 24, 1981 and July 21, 1981, respectively, both by Dr. John M. Ohno and assigned to the assignee of the present invention, additional configurations are disclosed. In Ser. No. 286,613, the technique of providing an interface layer between the crystal and core portions is disclosed, the interface layer comprising a dispersion of super-hard crystals at a concentration less than that of the first crystal dispersion layer. By providing such an interface layer, the cutting insert eliminates drastic changes or gradients in the composition of the cutting insert leading to a more rugged construction. In Ser. No. 226,604, the second crystal dispersion is employed to form a cutting insert having a first crystal dispersion with the high percentage of crystals covering the top portion of the insert, the second dispersion, having the lower concentration of crystals surrounding the size of the insert. Also disclosed is the use of a plunger having a chamfer for forming the bottom surface of the compacted core dispersion to compensate for a warpage of the resulting composite during the sintering process.

Still another configuration is disclosed in co-pending U.S. patent application Ser. No. 331,370, now U.S. Pat. 4,497,634, by Dr. John M. Ohno, filed concurrently herewith and assigned to the assignee of the present invention, the entire disclosure of which is hereby incorporated by reference. The configuration includes the use of a prepressed center piece for the core dispersion, the use of the center piece reducing the cost of the insert and reducing warpage during sintering. In co-pending U.S. patent application Ser. No. 331,365, now abandoned, by Dr. John M. Ohno, filed concurrently herewith and assigned to the assignee of the present invention, the entire disclosure of which is hereby incorporated by reference, a triangular insert provided with a particular configuration in which the corner portions containing the crystal dispersion material are elevated with respect to the central core portion is disclosed. Similar to Ser. No. 331,365, is co-pending U.S. patent application Ser. No. 331,375, now abandoned, which describes an insert having raised corner portions, with the addition of a thin relatively soft metal layer which is attached to the relatively lower central core portion of the insert.

SUMMARY OF THE INVENTION

It is an object of the invention to provide a technique for compacting the crystal and core dispersions provided in accordance with the press and treat technique in order to produce inserts selectively having one of a variety of configurations, such as those disclosed in the above-mentioned co-pending patent applications.

It is a further object of the present invention to provide an apparatus and process for rapidly, accurately and economically forming an intermediate composite adapted to be reaction sintered in accordance with the press and treat technique.

In accordance with the first aspect of the present invention, a process for providing an intermediate composite adapted to be sintered to produce a cutting insert comprises the steps of positioning a first pellet of material on top of a first plunger within a mold, disposing a powder mix adjacent to at least a portion of the pellet within the mold, compressing, in the mold, the powder mix and the pellet to produce the intermediate composite, and removing the intermediate composite from the mold.

More specifically, the pellet of material may include carbon fiber and filler in a temporary binder compressed to a first pressure, while the powder mix may include a dispersion of super-hard crystals in a temporary binder. The powder mix and the first pellet are compressed at a second pressure greater than the first pressure to thereby further compress the pellet of material. In accordance with preferred embodiments of the invention, the pellet of material may be provided with a chamfered surface or with a dome shaped top to thereby aid in the compaction process. The mold may be straight in the direction of compression to thereby produce an intermediate composite having a neutral relief, or the mold may have upper and lower portions of different diameters to thereby produce an intermediate composite having a positive relief.

The above described process may further include the steps of removing a previously made intermediate composite from the mold concurrently with the step of positioning the pellet of material on top of the first plunger, and the step of preparing a second pellet of material for positioning on top of the first plunger concurrently with the step of compressing the powder mix to produce the intermediate composite.

In accordance with a second aspect of the invention, an apparatus for producing an intermediate composite adapted to be sintered to produce a cutting insert includes a mold provided with top and bottom plungers, a device for positioning a pellet of material on top of the bottom plunger within the mold and a device for adding powder mix to the mold adjacent to the pellet, the top and bottom plungers functioning to compress the pellet and the powder mix to form the intermediate composite.

The mold may be provided with upper and lower portions having different sizes to thereby produce an intermediate composite having a positive relief. The top plunger may be provided with an outwardly extending central portion on the lower surface thereof in order to provide the intermediate composite with a centrally recessed portion on the upper surface thereof. The pellet of material may be provided with chamfered sides or a dome shaped upper surface. The device for positioning may include a holder having an inner dimension complementary to that of the outer dimension of the pellet of material for surrounding the pellet of material, and a first feeder having an inner dimension complementary to that of the outer dimension of the holder for surrounding and moving the holder to place the pellet of material in alignment with the top and bottom plungers.

More specifically, the first feeder is comprised of first and second portions, the first of which opens and closes the feeder about the holder by rotating about an axis of rotation. Alternatively, the feeder may be comprised of first and second portions which open and close about the holder by linearly moving one of the first and second portions of the feeder toward the other of the first and second portions with the holder interposed therebetween.

BRIEF DESCRIPTION OF THE DRAWINGS

FIGS. 1–6 are diagrams illustrating the step-by-step process employed in accordance with a first embodiment of the present invention;

FIGS. 7–9 are diagrams illustrating the step-by-step process employed in accordance with a second embodiment of the present invention;

DETAILED DESCRIPTION OF THE INVENTION

Figure 9:
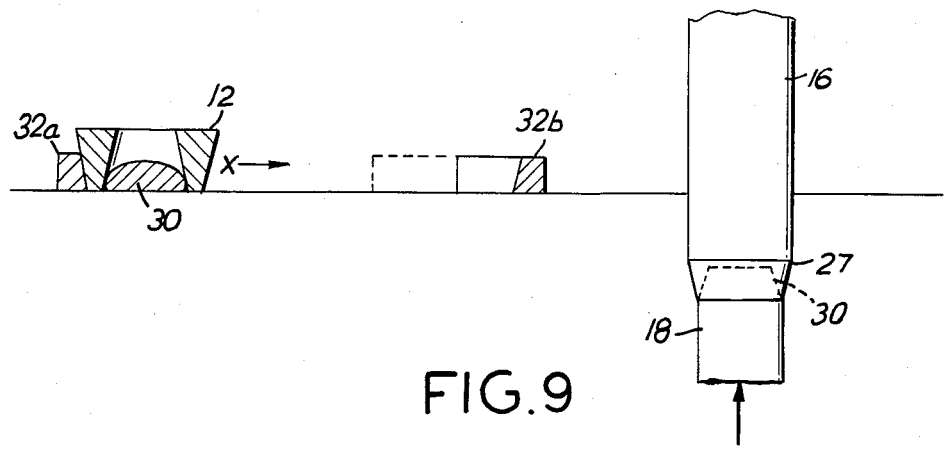

The process for compressing the diamond and core dispersions in order to provide the compressed composite in accordance with a first embodiment of the present invention will be described with reference to FIGS. 1–6. The present technique has as one of its fundamental characteristics, the provision of a prepressed pellet 10 comprised of the appropriate dispersion in the desired configuration. For example, in the process illustrated in FIGS. 1–6, the prepressed pellet 10 is provided as a prepressed core in the manner more fully described in the above-mentioned co-pending patent application Ser. No. 331,370. However, the pellet 10 can be configured in different ways and can consist of crystal and/or core dispersions in order to produce anyone of the composites disclosed in the above-mentioned co-pending patent applications. Modifications to the examples illustrated in FIGS. 1–10 in order to produce any of the variety of configurations discussed above, will be readily apparent to one skilled in the art apprised of the present invention.

Holder 12 is placed on top of pellet 10 which has been prepressed to a sufficient green strength. In the case of the process shown in FIGS. 1–6, pellet 10 is provided with a chamfer such that the diameter of the top portion is smaller than that of the bottom portion. The configuration of the internal diameter of holder 12 conforms to the configuration of the outer dimension of pellet 10. The holder 12 is then surrounded by a first feeder 14, having an inner diameter which conforms to the outer diameter of holder 12. Under the control of the first feeder 14, the holder 12 and the pellet 10 within the holder are moved in the X direction to alignment with top and bottom plungers 16 and 18, respectively. Upon doing so, as illustrated in FIG. 2, the compressed composite 20 produced in a prior machine cycle is pushed off in the X direction by the force of the first feeder 14 for further processing. Pellet 10 is now resting upon the top surface of bottom plunger 18, and upon moving the bottom plunger in a downward direction as shown in FIG. 3, pellet 10 also travels vertically downward a predetermined distance d into mold 19. This distance d can be precisely controlled so as to allow a precise amount of powder mix to be placed on top of the pellet, and to provide for a precise amount of pressure to be applied to the composite.

As shown in FIG. 4, the first feeder 14 functions to move holder 12 backwards along the X direction, and a second feeder 22 which contains the powder mix of super-hard crystals and binder (or the core dispersion and binder if so desired) follows the first feeder in the reverse X direction so as to deposit the powder mix 24 into the mold on top of pellet 10. The second feeder 22 is then moved away from the mold in the X direction, while the first feeder, which is comprised of left and right portions 14A and 14B, respectively, opens by causing the left portion 14A to rotate through approximately 180 degrees of rotation, whereupon holder 12 is removed in order to be placed on top of the next pellet for processing. By removing the second feeder 22 from the mold, a predetermined amount of powder mix 24 remains in the mold on top of the pellet 10.

Top and bottom plungers 16 and 18 then function to compress the powder mixture 24 onto the pellet 10, as shown in FIG. 6, to produce the intermediate composite which may now be delivered to apparatus for reaction sintering the composite to produce the insert in accordance with the press and treat technique. The pressure used to compress the insert shown in FIG. 6 should be greater than that employed to compress the pellet 10, such that pellet 10 is further compressed by plungers 16 and 18. In the meantime, holder 12 is placed upon a new pellet 10′ which will be processed in the same manner described above in the next machine cycle. The holder 12 is placed on the second pellet 10 a certain distance from the mold in the Y direction, perpendicular to the X direction, the holder moving toward the open first feeder at side 14B in the Y direction as shown in FIG. 6. The first feeder 14 may then be closed about holder 12, and plungers 16 and 18 moved upwardly in order to create the situation illustrated in FIG. 1, whereupon the cycle can be continued with the next pellet 10'.

As noted above, the plungers may have specific contours in order to provide intermediate composites having a particular configuration, and both the pellet 10 and powder mix 24 may include dispersions of a combination of crystal and core material to produce the configurations as desired. Further, it will be apparent to those skilled in the art that additional powder mixes may be further compressed onto the intermediate composites by simply repeating the steps illustrated in FIGS. 4-6, in order to produce multi-layer intermediate composites, such as those disclosed in co-pending patent application Ser. Nos. 286,613 and 226,604, for example, the disclosures of which are hereby incorporated by reference.

FIGS. 7-9 illustrate a technique for producing an intermediate composite having a positive relief and incorporating a technique for compressing the composite alternative to that illustrated in FIGS. 1-6. Unlike the vertically straight mold 19 illustrated in FIGS. 1-6, the mold shown in FIGS. 7-9 is provided with a wide diameter portion 26 and incline 28 adapted to produce an insert having a positive relief. As in the case of FIG. 1, holder 12 and pellet 30 are moved in the X direction by the first feeder 32 into alignment with the mold. Rather than providing the chamfer at the top of pellet 30 as is the case with pellet 10, pellet 30 is provided with a dome shape which, like the chamfer on pellet 10, produces a crack-free intermediate composite and also aids in the compaction process. As shown in FIG. 8, the pellet 30 is placed within the mold and provided with the powder mix 24 in a manner similar to that illustrated in FIG. 4. Rather than merely being disposed on top of pellet 30, the powder mix 24 is primarily provided in the wide diameter portion 26 and inclined portion 28 of the mold to thereby surround pellet 30 and bottom plunger 18. Feeder 32 is moved in the reverse X direction as illustrated in FIG. 8, whereupon holder 12 is removed in order to be placed upon the next pellet 30' to be processed. As shown in FIG. 9, rather than pivot open as in the case of first feeder 14, feeder 32 separates into left and right portions 32A, 32B, respectively, to thereby "recapture" holder 12 having the new pellet 30'. Specifically, holder 12, having the new pellet 30' therein, is moved onto the X axis so as to be colinear with feeders 32A and 32B, whereupon feeder 32A moves in the X direction into engagement with holder 12, thereby forcing holder 12 into further engagement with feeder 32B. Concurrently with this movement, upper and lower plungers 16 and 18 function to compress the pellet and powder mixture to produce the intermediate composite, top plunger 16 being forced down to point 27 corresponding to the bottom of the wide portion of the mold thus producing a positive relief insert.

Figure 10A:
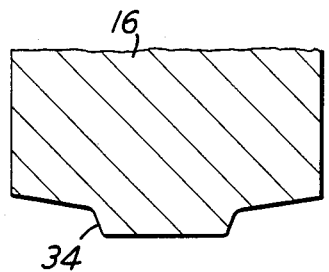
FIG. 10A illustrates the contour of the top plunger in accordance with a specific embodiment of the present invention.
Figure 10B:
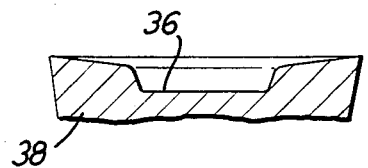
FIG. 10B illustrates the contour of the compressed composite produced by the top plunger illustrated in FIG. 10A.
Figure 10C:
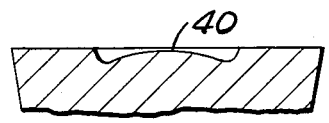
FIG. 10C illustrates the contour of the composite after reaction sintering.

FIGS. 10A-10C illustrate the preferred technique for forming the composite in accordance with the process illustrated in FIGS. 7-9. Specifically, top plunger 16 is provided with a centrally disposed, downwardly extending contour 34 which produces a complementary recessed portion 36 on the top surface of the intermediate composite 38 to thereby produce a composite similar to that described in co-pending patent application Ser. No. 331,365. Such a contour for the top plunger is also beneficial when producing the composite illustrated in FIGS. 7-9, since there is a great deal more powder mix within wide diameter 26 of the mold than there is on top of pellet 30. Such a configuration thereby facilitates the compaction of not only the powder mix 24 but also the further compression of pellet 30 from the top surface. Still further benefits are attained with the configuration of the top plunger as illustrated in FIG. 10A when warpage of the composite during sintering is considered. Specifically, in FIG. 10C the warpage which can be expected to occur is illustrated by a bulging portion 40 located in the center of the composite. Although greatly exaggerated in FIG. 10C, such warpage is easily compensated for through the use of the plunger shown in FIG. 10A.

The present invention therefore provides a technique for automatically picking up and delivering the pellet to the mold, the automatic feeding the power mixture onto the top of the pellet within the mold in a predetermined configuration, and the automatic compaction and removal of the intermediate composite for reaction sintering in accordance with the press and treat technique. The intermediate composites produced in accordance with the present technique may be provided with a wide range of configurations, multiple layer composites being readily obtainable by repeating selected steps of the technique. Further, the amount of powder mix which is loaded into the mold may be precisely adjusting by controlling the height of the bottom plunger as illustrated in FIG. 3.

While the technique in accordance with the present invention has been described specifically for use with the press and treat technique, the present invention may be employed for coating different materials onto a tungsten carbide pellet followed by conventional sintering, if so desired.

The above-mentioned patents, patent applications and/or publications are incorporated herein by reference. Other modifications and variations of the present invention are possible, in the light of the above teachings. It is therefore, to be understood that changes may be made in the particular embodiments of the invention described which are within the full intended scope of the invention as defined by the appended claims.

What is claimed is:

1. A process for providing an intermediate composite adapted to be sintered to produce a cutting insert, comprising the steps of:
    (a) pre-pressing a material into a first pellet having a chamfer such that the size of the top portion of the first pellet is smaller than the bottom portion;
    (b) positioning said first pellet on top of a first plunger within a mold;
    (c) moving the plunger downwardly into the mold, the first pellet thereby moving into the mold;
    (d) depositing a powder mix into the mold to thereby cover the sides and top portion of the first pellet;
    (e) compressing, in said mold, said powder mix and said pellet to produce said intermediate composite; and
    (f) removing said intermediate composite from said mold.

2. A process for providing an intermediate composite adapted to be sintered to produce a cutting insert, comprising the steps of:
    (a) pre-pressing a material into a first pellet having a dome-shaped top;
    (b) positioning said first pellet on top of a first plunger within a mold;

(c) moving the plunger downwardly into the mold, the first pellet thereby moving into the mold;

(d) depositing a powder mix into the mold to thereby cover the sides and top portion of the first pellet;

(e) compressing, in said mold, said powder mix and said pellet to produce said intermediate composite; and (f) removing said intermediate composite from said mold.

3. The process of claim 1 wherein said step of pre-pressing includes pre-pressing a material including carbon fiber and filler in a temporary binder, at a first pressure.

4. The process of claim 3 wherein said step of depositing includes depositing a powder mix including a dispersion of super-hard crystals in a temporary binder to said mold.

5. The process of claim 4 wherein said step of compressing includes compressing said powder mix and said first pellet at a second pressure greater than said first pressure.

6. The process of claim 1 wherein said mold is substantially straight in the direction of compression.

7. The process of claim 2 wherein said mold produces an intermediate composite having a relief.

8. The process of claim 7 further comprising compressing said powder mix about said first pellet with a second plunger having a central portion extending outwardly from the bottom of said second plunger.

9. The process of claim 1 further comprising the step of removing a previously made intermediate composite from said mold concurrently with the step of positioning said pellet of material on top of said first plunger.

10. The process of claim 9 further comprising the step of preparing a second pellet of material for positioning on top of said first plunger concurrently with the step of compressing said powder mix to produce said intermediate composite.

11. The process of claim 2 wherein said step of pre-pressing includes pre-pressing a material including carbon fiber and filler in a temporary binder, at a first pressure.

12. The process of claim 2 wherein said step of depositing includes depositing a powder mix including a dispersion of super-hard crystals in a temporary binder into said mold.

13. The process of claim 12 wherein said step of compressing includes compressing said powder mix and said first pellet at a second pressure greater than said first pressure.

* * * * *